(12) United States Patent  (10) Patent No.: US 8,451,478 B2
Tsunekawa  (45) Date of Patent: May 28, 2013

(54) INFORMATION PROCESSING APPARATUS, METHOD OF INFORMATION PROCESSING, AND STORAGE MEDIUM FOR PERFORMING SCALING PROCESSING ON IMAGE DATA

(75) Inventor: Kiyohiro Tsunekawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 923 days.

(21) Appl. No.: 12/511,949

(22) Filed: Jul. 29, 2009

(65) Prior Publication Data

US 2010/0027067 A1 Feb. 4, 2010

(30) Foreign Application Priority Data

Jul. 31, 2008 (JP) ................................ 2008-197973

(51) Int. Cl.
*G06F 3/12* (2006.01)
*G06K 15/00* (2006.01)
*G06K 9/36* (2006.01)
*G06K 9/32* (2006.01)

(52) U.S. Cl.
USPC ....... 358/1.15; 358/1.16; 358/1.17; 358/1.18; 382/276; 382/284; 382/298

(58) Field of Classification Search
USPC ............... 358/1.15, 1.2, 452, 449, 1.17, 1.16, 358/1.18, 530, 540, 3.06, 3.27, 426.09, 426.1, 358/426.01, 426.02, 426.06; 345/591, 589, 345/603, 614, 625, 628, 634, 660, 667, 472, 345/537, 547; 382/267, 293, 289, 284, 282, 382/277, 296, 298, 309, 276
See application file for complete search history.

(56) References Cited

U.S. PATENT DOCUMENTS

| | | | | |
|---|---|---|---|---|
| 7,640,516 B2 * | 12/2009 | Atkins | ........................... | 715/853 |
| 7,724,391 B2 * | 5/2010 | Suzuki | ........................ | 358/1.18 |
| 2005/0237574 A1 | 10/2005 | Ozawa | | |
| 2008/0062438 A1 * | 3/2008 | Lin et al. | ........................ | 358/1.2 |
| 2009/0089660 A1 * | 4/2009 | Atkins et al. | .................. | 715/243 |

FOREIGN PATENT DOCUMENTS

| | | |
|---|---|---|
| JP | 2000-255123 | 9/2000 |
| JP | 2001-101431 | 4/2001 |
| JP | 2006-246374 A | 9/2006 |

OTHER PUBLICATIONS

Toshiaki, Drawing Processing Apparatus, Sep. 9, 2000, Machine Translation, Japanse Patent Application Publication JP2000255123, all pages.*

* cited by examiner

*Primary Examiner* — Benny Q Tieu
*Assistant Examiner* — Ngon Nguyen
(74) *Attorney, Agent, or Firm* — Canon USA Inc. IP Division

(57) ABSTRACT

An information processing apparatus transmits a print job including input image data to an image processing apparatus connected thereto, and includes: a determination unit that determines whether a width and/or height of the input image data is smaller than a predetermined threshold, and whether a scaling factor for the image data at a time of output is one or less; a color value determination unit that determines color values of pixels constituting the image data in the case that it has been determined that the width and/or height of the image data is smaller than the predetermined threshold and that the scaling factor for the image data at the time of output is one or less; and a transmission unit that, in the case that it has been determined that the pixels constituting the image data have the same color value, transmits replacement image data having a smaller size.

7 Claims, 12 Drawing Sheets

SOURCE IMAGE    DESTINATION IMAGE

SOURCE IMAGE    DESTINATION IMAGE

SOURCE IMAGE    DESTINATION IMAGE

FIG. 11

```
{0x53}                                              :[START IMAGE] COMMAND
<0xe8> (0589) (0772)                                :START POSITION
<0xe2> (2) (1)                                      :DESTINATION SIZE (W × H)
<0xe3> (6) (2)                                      :SRC SIZE (W × H)
<0xe5> (1)                                          :COLOR SPACE (1 = RGB)
<0xe6> (8)                                          :GRADATION (8 BITS)
<0xe1> (0)                                          :COMPRESSION TYPE (0 = UNCOMPRESSED)
<0xe4> (1)                                          :DATA TRANSMISSION MODE (1 = BATCH TRANSMISSION)

{0x54}                                              :[TRANSFER IMAGE] COMMAND
<0xd7> (36)                                         :DATA SIZE (NUMBER OF BYTES)
[(0xff 0x00 0x00) (0xff 0x00 0x00) ...]             :IMAGE DATA
..                                                  :(36 BYTES)

{0x18}                                              :[END IMAGE] COMMAND
```

```
{0x53}                                          :[START IMAGE] COMMAND
 <0xe8> (0589) (0772)                           :START POSITION
 <0xe2> (2) (1)                                 :DESTINATION SIZE (W × H)
 <0xe3> (2) (1)                                 :SRC SIZE (W × H)
 <0xe5> (1)                                     :COLOR SPACE (1 = RGB)
 <0xe6> (8)                                     :GRADATION (8 BITS)
 <0xe1> (0)                                     :COMPRESSION TYPE (0 = UNCOMPRESSED)
 <0xe4> (1)                                     :DATA TRANSMISSION MODE (1 = BATCH TRANSMISSION)

{0x54}                                          :[TRANSFER IMAGE] COMMAND
 <0xd7> (36)                                    :DATA SIZE (NUMBER OF BYTES)
 [ (0xff 0x00 0x00) (0xff 0x00 0x00) ]          :IMAGE DATA (6 BYTES)
 ..

{0x18}                                          :[END IMAGE] COMMAND
```

1201

INFORMATION PROCESSING APPARATUS, METHOD OF INFORMATION PROCESSING, AND STORAGE MEDIUM FOR PERFORMING SCALING PROCESSING ON IMAGE DATA

BACKGROUND OF THE INVENTION

1. Field of the Invention

The present invention relates to an information processing apparatus for performing scaling processing on image data.

2. Description of the Related Art

Known processing methods for creating print data from electronic documents include print instructions using a page description language (PDL).

In other words, a printer driver operating on a host computer converts print instructions from application software into PDL print data that can be processed by image processing apparatuses.

An image processing apparatus that receives a print processing job is configured to create a bitmap image (page image) representing the content of a page corresponding to the PDL.

Such image data rendering commands in PDL includes a group of commands such as character printing commands, various graphic commands including line drawing commands, and image rendering commands.

Some of the image data rendering commands in PDL include versatile commands such as logical rendering operations (specifying a raster operation (ROP) such as AND or OR), specifying a clipping area, macro commands storing and calling a plurality of commands in a group, and a command group for setting up various printing environments.

In accordance with the development of a print on demand (POD) market and increasingly versatile user needs in recent years, the content of print instructions from application software such as DTP or CAD software, output to image processing apparatuses such as page printers, is becoming increasingly complex.

Hence, there is an increasing demand for an increased processing speed for PDL data.

Examples of the cases in which the content of printing commands becomes complex, as described above, or the volume of the commands increases include cases in which image data handled by application software is divided into a plurality of minute areas, and is rendered as a large number of fragmentary pieces of image data.

In some of these cases, application software divides a single block of image data into around a million minute areas, in accordance with the kind of the application, the size of the original image data, or the printing resolution with which an image processing apparatus processes the data.

In this case, when reduction is specified for the individual divided image data blocks in accordance with print settings or the kind of applications, the printing performance is decreased due to the following reasons.

(1) The size of print data is too large since image data before reduction, which exceeds the size of a print area printed by an image processing apparatus, is sent from a printer driver to the image processing apparatus.

(2) A reduction process for received image data is required in the image processing apparatus to suppress the degradation of quality in accordance with the reduction ratio specified by the printer driver, using a predetermined interpolation algorithm.

In a great number of cases, an individual divided minute image data block is a single-color image data block which consists of pixels having the same color value.

As a technology for increasing the processing speed for such single-color images, the following technology is disclosed in Japanese Patent Laid-Open No. 2000-255123.

(1) It is determined whether or not image data consists of a single color, and when it is determined that the image data consists of a single color, a color conversion process for part of the image data is omitted, and the area for which the process was omitted uses the same color value as that of the result of the color conversion process for other parts, thereby increasing the speed of the color conversion process.

(2) It is determined whether or not image data can be converted into graphic data, and the image data that has been determined to be able to be converted into graphic data is converted into graphic data.

The following technology is disclosed in Japanese Patent Laid-Open No. 2001-101431 as a technology for increasing the speed using the characteristic of the pixels of a rendering object.

(1) By detecting the horizontal or vertical direction of gradation, a portion of the image in a direction perpendicular to the gradation direction is replaced with a number of adjacent pixels having the gradation level of the first pixel (a line of pixels having the same gradation is created by copying the first pixel).

(2) Gradation is created by repeatedly copying the pixels of the first row for the horizontal gradation and repeatedly copying the pixels of the first column for the vertical gradation.

In the image processing apparatus described in Japanese Patent Laid-Open No. 2000-255123, input PDL commands are analyzed one by one, and image rendering commands are sequentially processed, thereby increasing the processing efficiency in the image processing apparatus.

However, Japanese Patent Laid-Open No. 2000-255123 does not address the problem that the excessive size of the print data is sent when a printer driver sends a large number of minute image data blocks to an image processing apparatus, where a reduction process is performed.

Japanese Patent Laid-Open No. 2001-101431 has a problem in that since a constant-gradation direction, i.e., a direction in which the same color value is repeated, is detected independent of the sizes of objects, a time-consuming process of detecting single-color image data for all the objects is required, thereby increasing the total processing time.

As described above, known information processing apparatuses have the problem of the excessive size of the print data and increased processing time when image data divided into minute data blocks is reduced and sent from a printer driver to an image processing apparatus to be output.

SUMMARY OF THE INVENTION

To solve the above-described problems the present invention provides an information processing apparatus that transmits a print job including an input image data block to an image processing apparatus to which the information processing apparatus is connected, and includes the following: (1) a determination unit configured to determine whether or not a width and/or height of the input image data block is smaller than a predetermined threshold, and whether or not a scaling factor for the image data block at a time when the image data block is output by the image processing apparatus is one or less; (2) a color value determination unit configured to determine color values of pixels corresponding to the image data block in the case that the determination unit has determined that the width and/or height of the image data block is smaller than the predetermined threshold and that the scaling factor for the image data block at the time when the image data block is output by the image processing apparatus, is one or less; and (3) a transmission unit configured to, in the case that the color value determination unit has determined that the pixels corresponding to the image data block have the same color value, transmit a replacement image data block having a smaller size than the original image data block.

The present invention configured as described above provides the following advantages by simplifying the reduction process for single-color image data for which reduction is specified.

It becomes unnecessary for the printer driver in an information processing apparatus to transmit image data of a source image whose width and height are larger than those of a destination area in an output apparatus, where printing is to be performed.

This allows reduction in print data size, thereby increasing the speed of an image rendering process.

Further, it becomes unnecessary for an image processing apparatus to perform complex reduction processing, for each pixel, including interpolation in accordance with the scaling factor.

This allows reduction of the image data processing load of an image processing apparatus, thereby increasing the speed of a printing process.

Further features of the present invention will become apparent from the following description of exemplary embodiments with reference to the attached drawings.

BRIEF DESCRIPTION OF THE DRAWINGS

FIG. 11 illustrates examples of image rendering commands created by an existing printer driver.

FIG. 12 illustrates examples of image rendering commands created by the printer driver according to the first embodiment.

DESCRIPTION OF THE EMBODIMENTS

Examples of the usage of image data rendering commands in a PDL program used in the embodiments described below are explained with reference to FIGS. 5 and 11.

Figure 5:
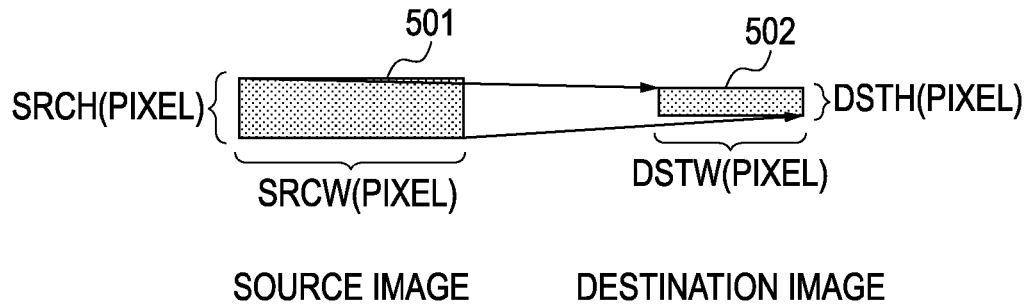
FIG. 5 is a schematic diagram showing an existing rendering method for image data having a specified scaling factor.

FIG. 5 shows how a source image 501 described as PDL data, i.e., image data associated with a real image, is rendered, through scaling, in an area shown by a destination image 502.

The area shown by a destination image is an image area into which data is output after being developed by a printer. In other words, it is a rendering area after a source image has been scaled. The size of this area is determined by a reduction/enlargement factor and the size of the source image.

In other words, the enlargement or reduction of image data is thought to be specified by an image data rendering command accompanied by the following four parameters.

width (srcw) and height (srch) of a source image
width (dstw) and height (dsth) of a destination image Here, the scaling factors are classified into enlargement/same size/reduction in accordance with the value relationship of the four parameters. For instance, when the width srcw of a source image is larger than the width dstw of a destination image, rendering is performed by reducing the size in the horizontal direction of the source image data by a predetermined factor, as shown in FIG. 5.

FIG. 11 shows specific examples of image data rendering commands.

In FIG. 11, one byte in "{ }" shows the kind of a rendering command, and one byte in "< >" shows the kind of a parameter accompanying the rendering command.

Here, an image rendering command consists of a group of commands: {0x53} ("start image" command), {0x54} ("transfer image" command), and {0x18} ("end image" command).

The parameters of a "start image" command specify various attribute information for the image data. The two numerical values following <0xe2> show the width dstw and height dsth of the destination image, and the two numerical values following <0xe3> show the width srcw and height srch of the source image, all in units of pixels.

The rendering commands shown in FIG. 11 show an example of rendering image data for an image for which the width×height=6×2 pixels, the color type=RGB, the pixel gradation=8 bits, and the compression type=uncompressed, at a position (589, 772) in the page coordinates by reducing the size of the image into an area of 2×1 pixels.

In other words reduction of ⅓ in the height direction and ½ in the width direction are instructed.

At this time, a parameter of a "transfer image" command specifies the entity of the image data, which is represented by the exact volume in bytes of the source image calculated from the width, height and gradation thereof. In FIG. 11, one pixel of the image data consists of three elements R, G, and B, a total of three bytes, and hence the 6 (width)×2 (height) source image is represented by 6×2×3=36 bytes.

First Embodiment

Hereinafter, a first embodiment of the present embodiment is described with reference to the attached drawings.

Figure 1:
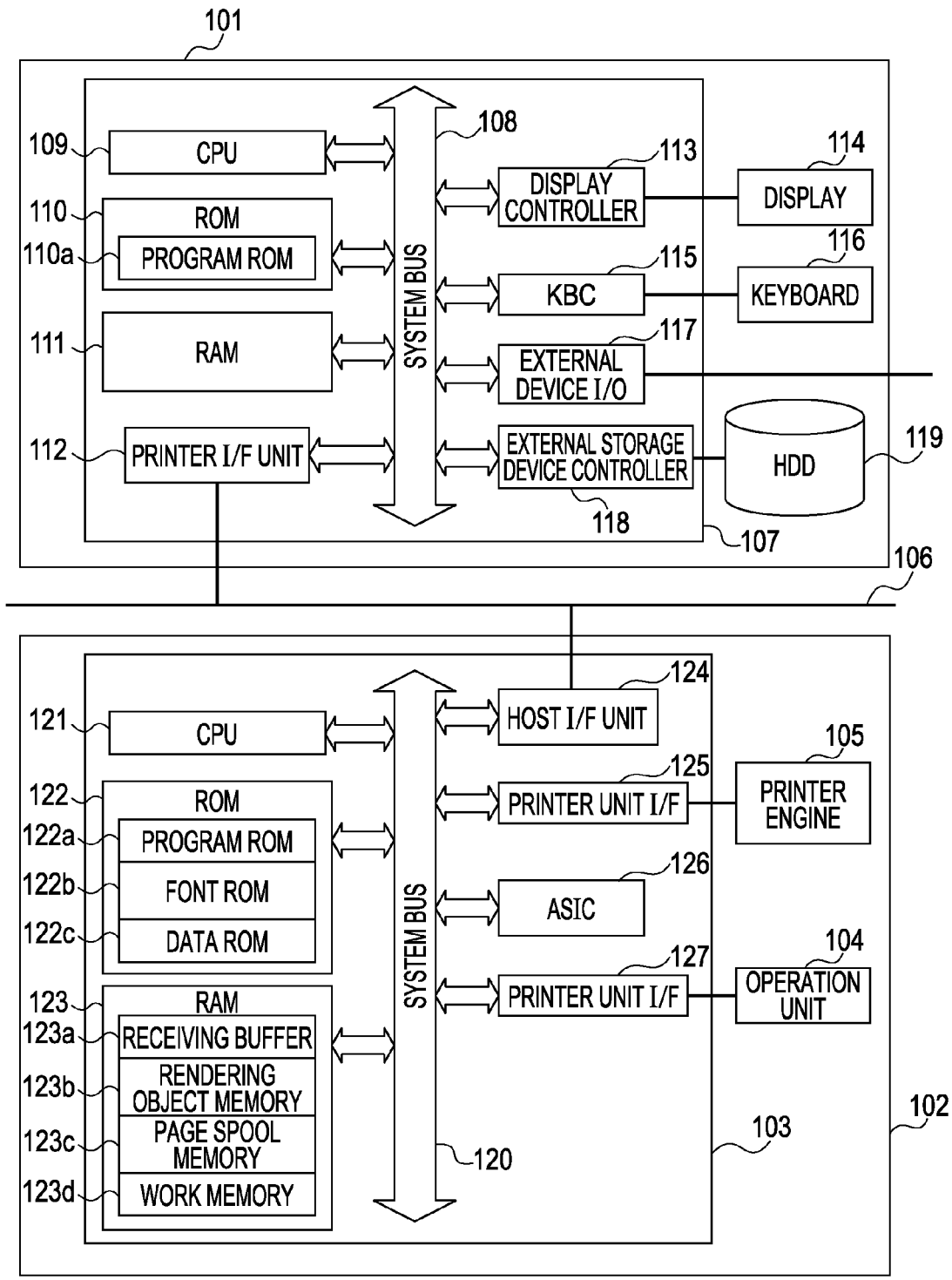
FIG. 1 is a block diagram explaining a configuration of an image processing system including a host computer and a printer according to embodiments of the present embodiment.

FIG. 1 shows a block diagram explaining a configuration of an image processing system according to the present embodiment.

Note that the present invention, if the functions of the invention are realizable, can be applied to a configuration functioning in a single information processing apparatus or a system including a plurality of apparatuses such as a client server system, unless otherwise stated.

In FIG. 1, a reference numeral 102 denotes a host computer, which includes a CPU 109.

The CPU 109 performs processing of documents including graphics, images, characters, etc., by using the application programs stored in a program ROM 110a included in a ROM 110 or on a hard disk drive (HDD) 119, which is an external storage device.

Further, the CPU 109 performs overall control of various devices connected to a system bus 108 on a control board 107 in the host computer 101.

The program ROM 110a or the HDD 119, which is an external storage device, stores a boot program for setting initial settings at the time of power on, and the operating system program (hereinafter called OS), which is a basic control program.

This OS controls various externally connected devices and performs resource management for a RAM 111 and the HDD 119.

A font ROM (not shown) in the ROM 110 and the HDD 119, which is an external storage device, store font data to be displayed on a display 114.

The HDD 119, which is an external storage device, stores various data files used for the document processing, and also stores a program file of a printer driver that converts print instructions from the application into print control commands that can be interpreted by a printer 102.

The RAM 111 functions as the main memory of the CPU 109, a work area, etc.

A keyboard controller (KBC) 115 controls input from a keyboard 116 and a pointing device (not shown).

A display controller 113 controls display of the display 114.

An external storage device controller 118 controls accessing of the HDD 119, which is an external storage device storing the OS, various applications, additional font data, user files, etc.

An external device I/O 117 controls accessing of an optionally added external device (not shown), such as a hard disk drive and a floppy (registered trademark) disk.

A printer I/F unit 112, connected to the printer 102 via a predetermined bidirectional interface 106, controls processing of communication with the printer 102.

Examples of bidirectional interfaces include a USB interface, an IEEE 1394 interface, and a wired or wireless LAN.

A user who controls the host computer 101 opens a window regarding print settings using a menu of applications, and sets print settings such as a print mode and the number of copies using the keyboard 116 etc.

In the printer 102 to which the host computer 101 is connected, a printer 121 performs overall control of various devices such as an ASIC 126, which is a hardware circuit, connected to a system bus 120 in a printer control unit (controller) 103. A printer CPU 121 creates an output image using a control program stored in a program ROM 122a, and outputs a video signal in accordance with the output image to a printer engine (printing unit) 105 connected via a printing unit I/F 125.

The program ROM 122a includes at least one kind of page description language analysis program (hereinafter called a PDL interpreter).

The printer CPU 121, by executing a PDL interpreter loaded in a RAM 123, interprets a print job output from the host computer 101, and converts the print job into bitmap data which is printable by the printer engine 105.

The printer 102 may be configured so as to allow an optional ROM to be mounted in an expansion ROM slot (not shown), whereby another kind of PDL interpreter included in the optional ROM may be added. Alternatively, using a configuration which stores more than one kind of PDL interpreter in the program ROM 122a in advance, a PDL interpreter may be added by being optionally made valid on the basis of a license key entered through a user operation.

Examples of PDLs include LIPS, PostScript, and PCL.

A ROM 122 further includes a font ROM 122b that stores font data used to create the output image and a data ROM 122c that stores tables used for various kinds of image processing, etc.

The printer CPU 121 is configured so as to be allowed to communicate with the host computer 101 via a host I/F unit 124. The printer CPU 121 receives print data, and notifies the host computer 101 of various status information of the printer 102. The RAM 123 functions as a program area for loading a program executed by the printer CPU 121, a work area for storing various data, etc. In other words, the RAM 123 is used as a receiving buffer 123a for temporarily storing a print job received from the host computer 101, and is used to create a page image in accordance with the input PDL. For instance, the RAM 123 is used as a rendering object memory 123b for storing the analysis result of the print job as an intermediate object and a page spool memory 123c for storing a page image into which the rendering object has been developed. Further, the RAM 123 is used as a work memory 123d for storing environment data and an NVRAM (not shown) for storing menu setting content, etc.

An operation unit 104 includes an operation panel used to set various menus and other operations for the printer 102 via the printing unit I/F 127, an LED display unit, etc.

The printer 102 is configured in such a manner as to allow the memory capacity to be increased by an optional RAM connected to an expansion port (not shown).

The printer engine 105 performs printing by forming a latent image on a photoconductor drum in accordance with a video signal, and making the image be thermally fixed on a sheet.

The printer engine 105 applied to the present embodiment may be an image processing apparatus based on various printing systems, such as a laser beam printer (hereinafter, called an LBP) or an inkjet printer.

Further, a single function image processing apparatus (SFP) having only a printer function or a multifunction image processing apparatus (MFP) having multiple functions such as copy/fax/print functions. Here, SFP and MFP respectively stand for "single function peripheral" and "multi function peripheral".

In other words, any configuration which can realize the control according to the present embodiment may be employed.

Figure 2:
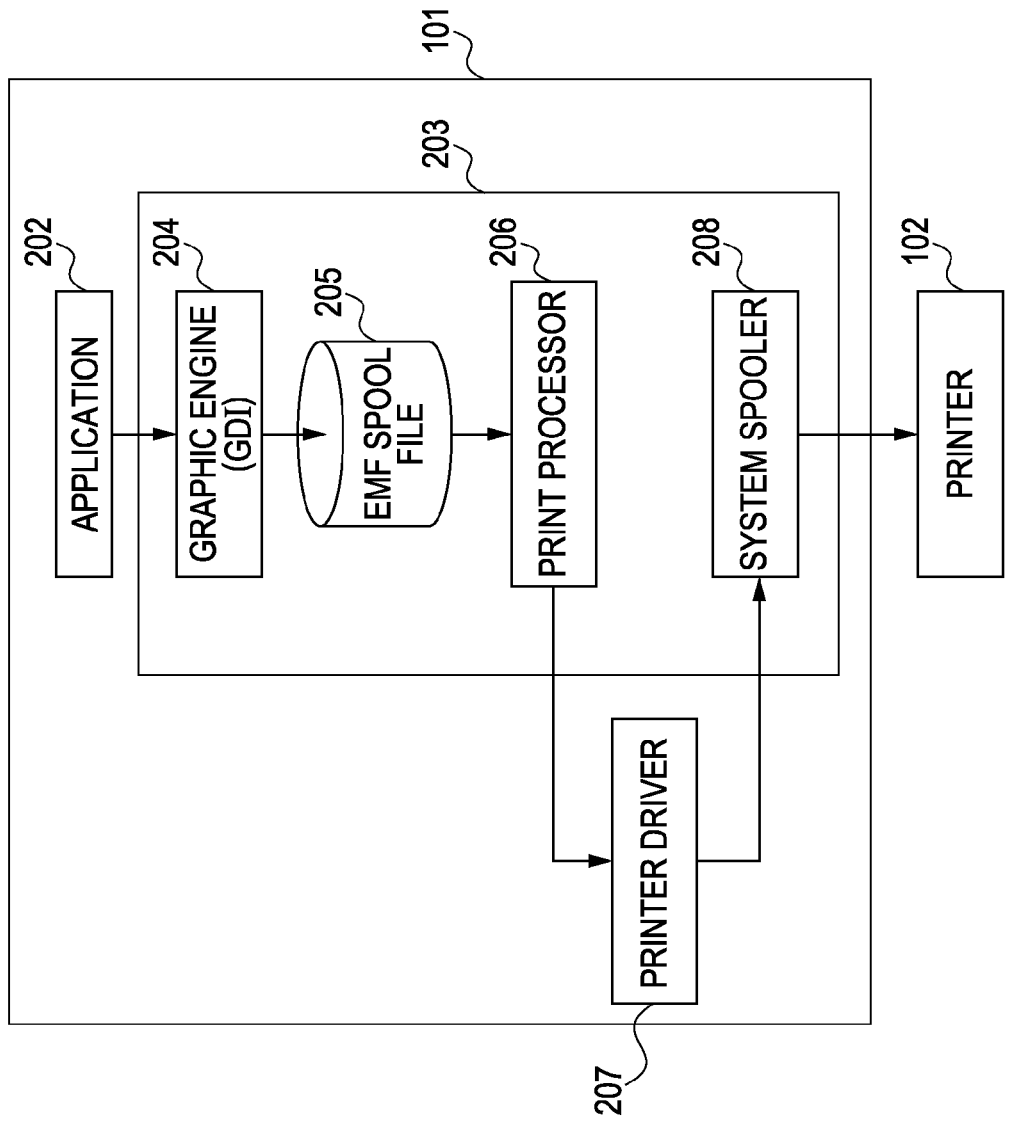
FIG. 2 is a block diagram showing a configuration of program modules, operating on the host computer, regarding a printing process in a first embodiment.

FIG. 2 is a block diagram showing a program configuration regarding a printing process in the host computer 101 according to the present embodiment.

Figure 4:
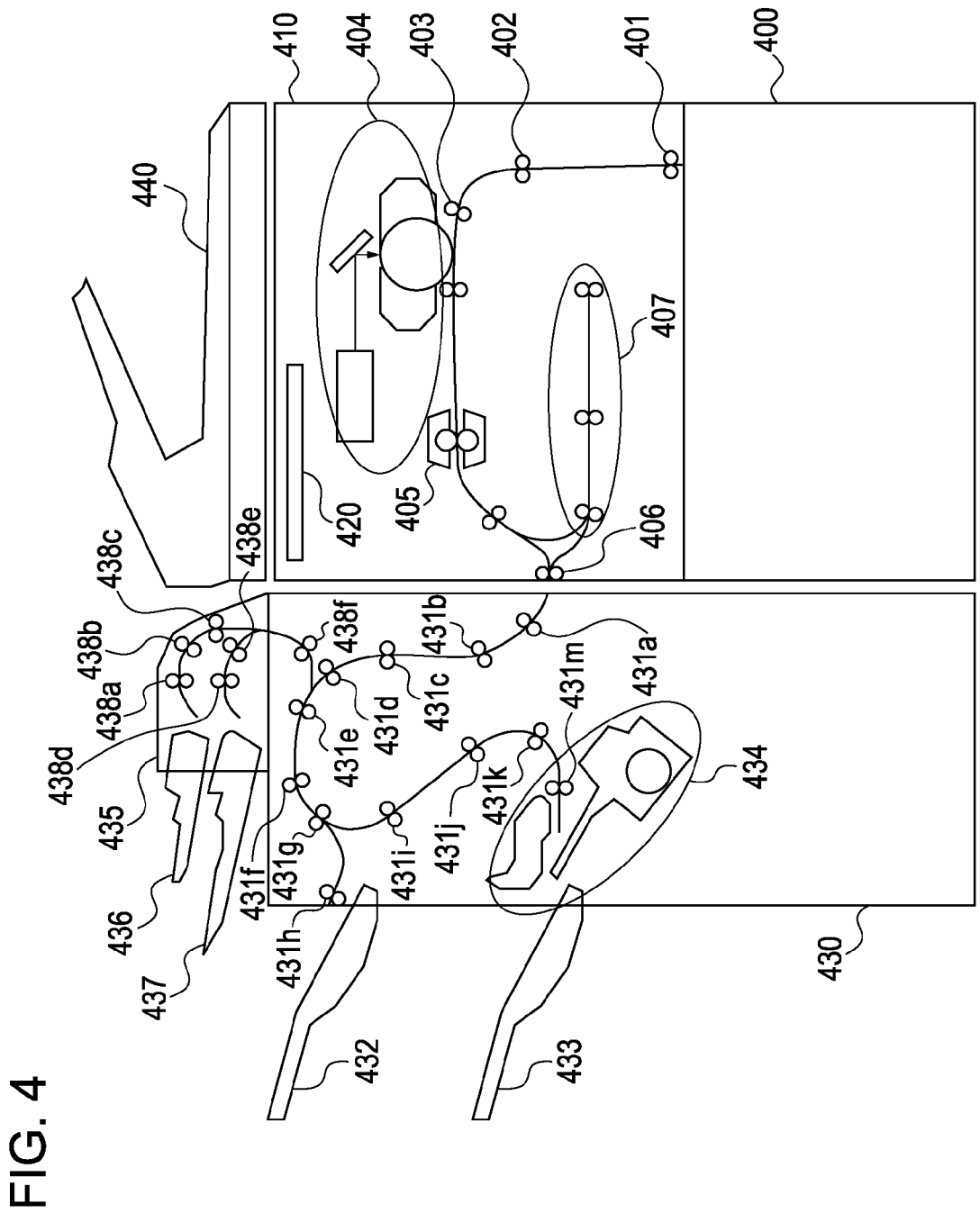
FIG. 4 is a sectional view showing the internal structure of an MFP as an example of an image processing apparatus according to the first embodiment.

In FIG. 4, an application 202, a graphic engine 204, a print processor 206, a printer driver 207, and a system spooler 208 are stored as files in the HDD 119, which is an external storage device, shown in FIG. 1. These are a group of program modules which are loaded in the RAM 111 by the OS at the time of execution and executed by the CPU 109. Note that the graphic engine 204, the print processor 206, and the system spooler 208 are provided as OS modules 203, which are part of the OS.

The application 202 and the printer driver 207 can be installed in the HDD 119 via a CD-ROM or a network connected to the external device I/O 117.

Here, when the application 202 gives various rendering instructions to the display 114 or the printer 102, the application 202 performs rendering using GDI, which is a group of service functions provided by the graphic engine 204, part of the OS. Here GDI stands for Graphic Device Interface.

When a user gives a print instruction for a document through operation of the print menu of the application 202, the graphic engine 204 first creates an EMF spool file, which is composed of intermediate code, in accordance with the print instruction from the application 202, and temporarily spools it. Here, the EMF spool file is an Enhanced Metafile type file.

Then the print processor 206, similarly loaded in the RAM 111 from the HDD 119, reads the print data temporarily stored as a spool file 205, converts the rendering instructions using GDI functions into DDI functions, and sends a notification to the printer driver 207. Here, DDI stands for Device Driver Interface.

The printer driver 207 converts the DDI functions received from the print processor 206 into PDL commands which can be interpreted by a printer. The PDL commands after the conversion is output to the printer 102 as a print job through the system spooler 208 and via the bidirectional interface 106, in the present configuration.

By temporarily creating a spool file as described above, the application 202 is released after all the print instructions are converted into intermediate code and output to the spool file 205. Hence the printer driver 207 is released earlier than when waiting for the printer driver 207 to finish the conversion of all the print instructions into PDL commands.

The printer driver 207 is configured to be able to process the content of the spool file 205 in various manners.

In other words, the printer driver 207 can perform enlarging/reducing of a page, n-up printing in which a plurality of pages are printed as one page after reduction in size, or the like, in accordance with the layout information set using GUI provided by the printer driver 207.

Figure 3:
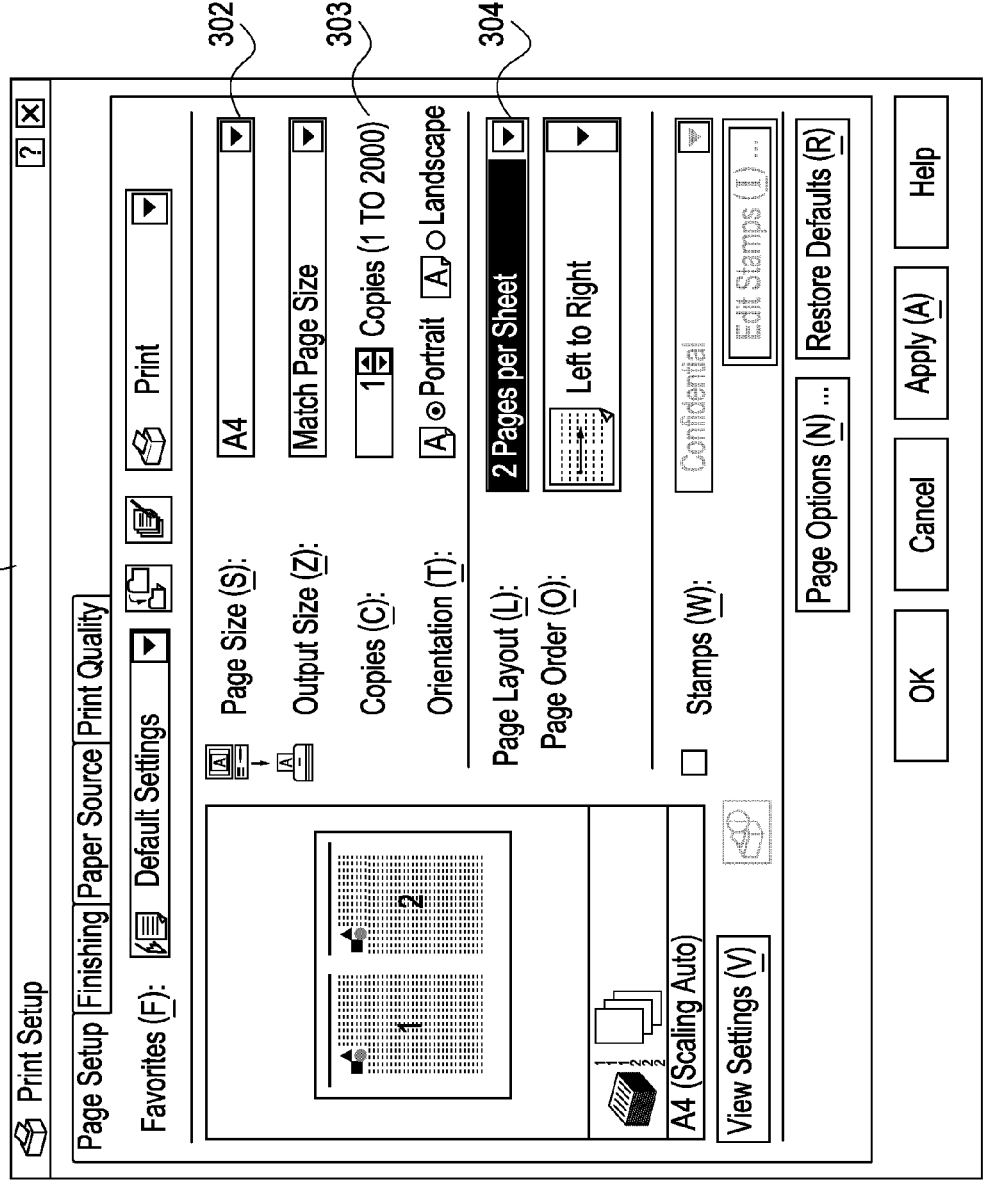
FIG. 3 illustrates an example GUI screen of a printer driver according to the first embodiment.

FIG. 3 shows an example GUI screen displayed on the display 114 by the printer driver according to the present embodiment.

Reference numeral 301 shows an example of a print tab used for page setup. Furthermore, the print tab includes a page size selection box 302, a box 303 for specifying the number of copies, a page layout setting box 304 for specifying a layout, such as n-up printing, etc.

The print settings specified here are stored in a work area in the printer driver, and are referred to when print instructions from the print processor 206 are processed.

In the print quality tab in FIG. 3, print quality settings, such as print resolution and a color mode can also be specified.

In the configuration described above, various print settings specified by a user are included in print data so as to be transmitted to the printer 102.

FIG. 4 is a sectional view showing the internal structure of an MFP as an example of the printer 102 included in the image processing system according to the present embodiment.

In FIG. 4, reference numeral 410 denotes a mechanical printing unit. The mechanical printing unit 410, when receiving a print instruction, feeds a sheet from a paper feeding unit 400, and the sheet is passed through an image forming unit 404 using sheet conveying rollers 401, 402, and 403. In the image forming unit 404, toner is transferred to the sheet using electrophotography. In other words, in accordance with a video signal output from a control unit 420, a laser driver drives a semiconductor laser to scan the surface of an electrostatic drum, whereby an electrostatic latent image is formed which is made of charged toner. This latent image, after undergoing development performed by a developing unit surrounding the drum, is transferred to a sheet.

The toner transferred to a sheet is fixed on the sheet by heat and pressure while it passes through a fixing device 405. The sheet with toner fixed thereon is output through a sheet conveying roller 406 to a sheet ejecting unit (finisher) 430. However, when the sheet is output as is, the printed surface faces upward (face up). Hence, the sheet is usually switched back using a switch back path 407, whereby the printed surface is made to face downward (face down), and then output via a sheet conveying roller 406 to the finisher 430.

The sheet fed from the mechanical printing unit 410 to the finisher 430 is ejected to an upper tray 432 or a lower tray 433 using sheet conveying rollers 431a to 431m. The upper tray 432 is a general paper output tray, but the lower tray 433 is a paper output tray which can hold sheets that have undergone a folding process. In the finisher 430 according to the present embodiment, a paper folding unit 434 is provided in front of the lower tray 433. A sheet for which folding is specified is folded by the paper folding unit 434 and then output to the lower tray 433.

The finisher 430 is provided with an inserter 435 used to insert a partitioning sheet. A sheet set on an inserter tray 436 or 437, which is part of the inserter 435, may be fed at any time. The sheet is output to the upper tray 432 or the lower tray 433 using sheet conveying rollers 438a to 438f and sheet conveying rollers 431e to 431m.

Reference numeral 420 denotes a control unit (controller) used to control the entire apparatus and corresponds to the control unit 103 shown in FIG. 1.

Reference numeral 440 denotes a scanner. An image captured by the scanner 440 is processed by the control unit 420 to produce a copy image to be printed.

Figure 14:
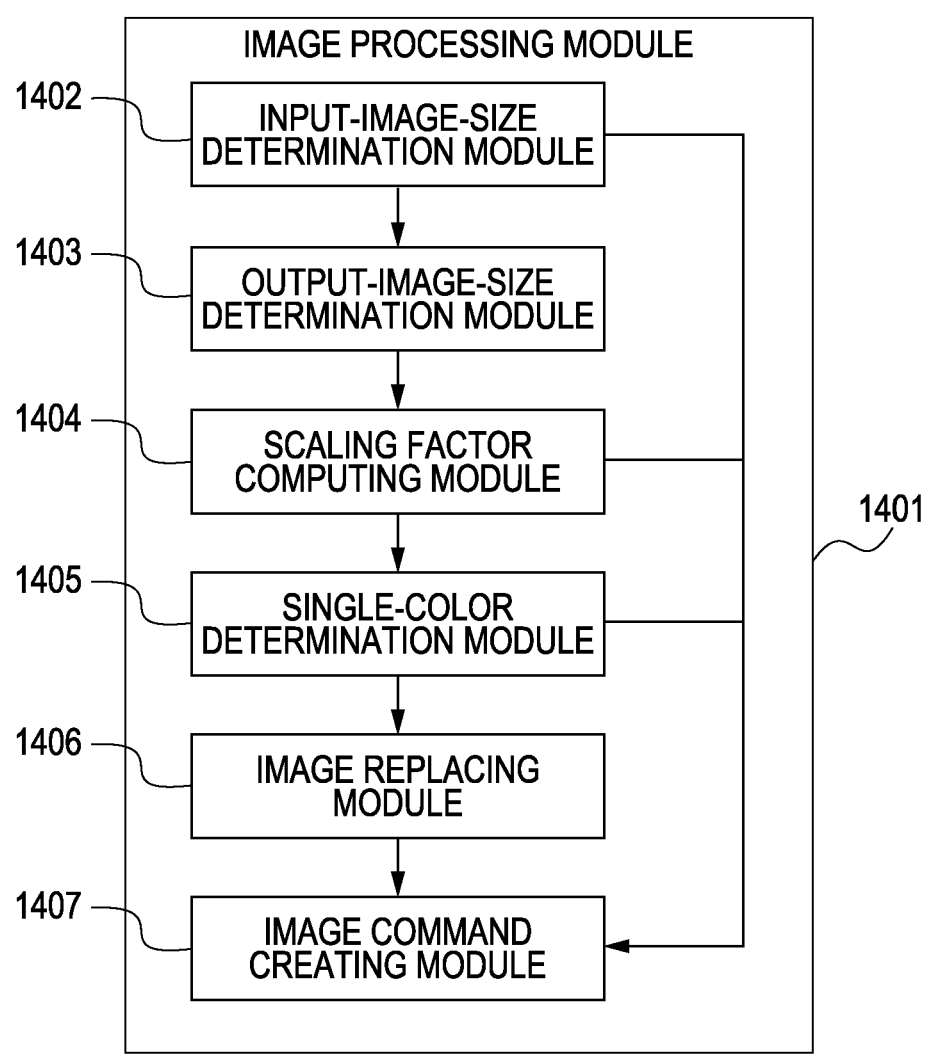
FIG. 14 illustrates a configuration of part of an image processing module in the printer driver according to the first embodiment.

FIG. 14 shows the configuration of part of an image processing module in the printer driver 207 according to the present embodiment. Reference numeral 1401 in FIG. 14 denotes an image processing module which is called when the DDI function received from the print processor 206 is an instruction to render image data. The image processing module 1401 includes the following modules (1402 to 1407), shown below. An input-image-size determination module 1402 determines the image size of the image data specified by the print processor 206. An output-image-size determination module 1403 determines the image size of a destination area. A scaling factor computing module 1404 computes the scaling factor of the image data. A single-color determination module 1405 determines whether or not the image data is single-color image data. An image replacing module 1406 is a module called when the image data is single-color image data. An image command creating module 1407 creates image commands used to create PDL data by performing color processing, such as color matching processing, and compression processing on the image data.

Image Data Processing Step

The steps of creating print data in the image processing apparatus according to the present embodiment will now be described with reference to the flowchart shown in FIG. 8.

Figure 8:
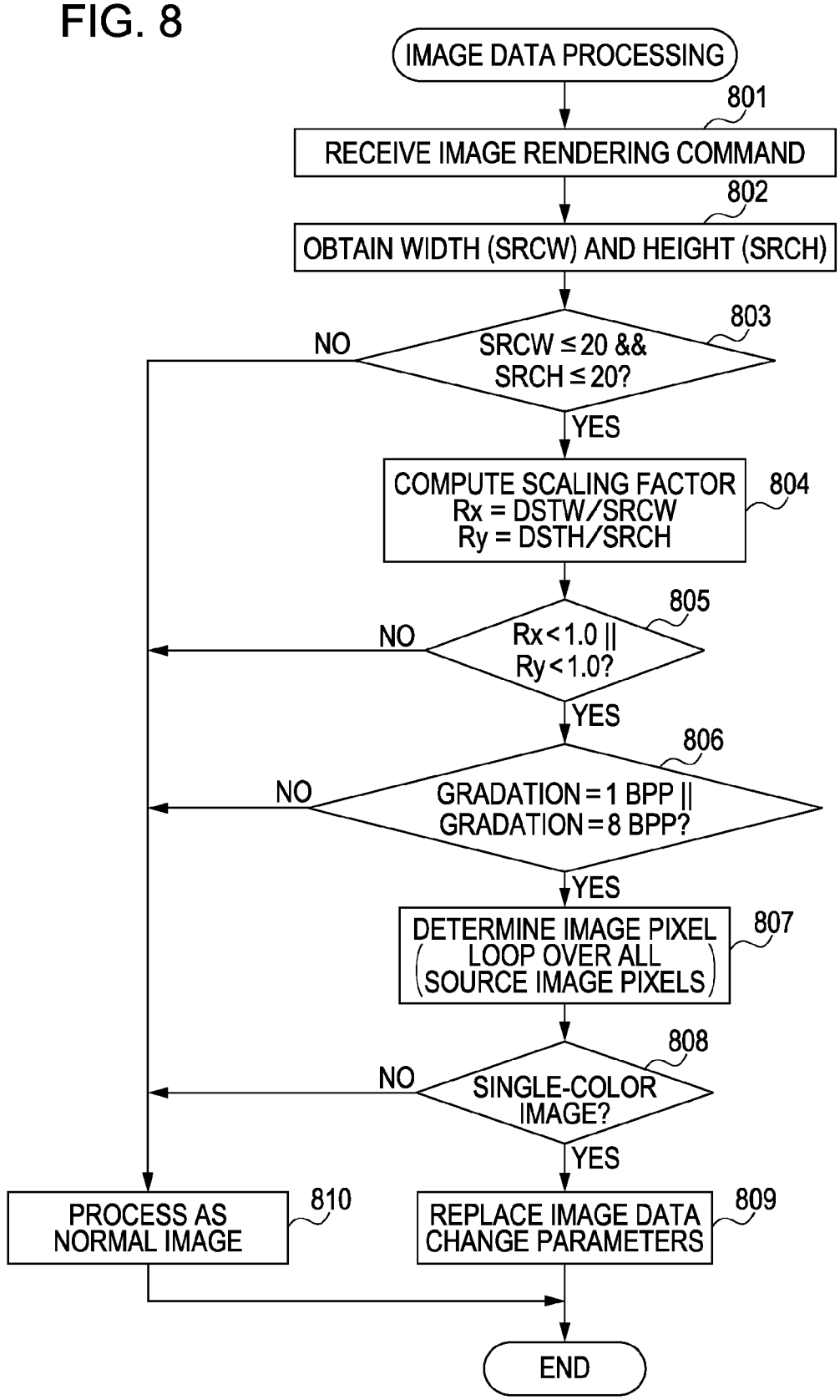
FIG. 8 is a flowchart showing the steps of processing image data performed by the printer driver of the first embodiment.

FIG. 8 shows the steps of processing one block of image data performed by the printer driver 207.

The steps of the flow is controlled by the CPU 109 of the host computer 101.

In step S801 shown in FIG. 8, the image processing module 1401 receives image data from the print processor 206 in the form of a DDI function instructing rendering of the image data. In step S802, the width and height of a source image are obtained from the rendering parameters specified by the DDI function.

In step S803, it is determined whether or not the width and/or height of the source image is equal to or less than a threshold of 20 pixels. If the determination result is No, the image command creating module 1407 creates PDL data as normal image data in step S810.

When the determination result in S803 is Yes, a scaling factor R is computed from the widths and heights of the source image and destination image in step S804. Note that in the present embodiment, scaling factors in the x and y directions can be specified independently, as follows:

x-direction scaling factor: $Rx=dstw/srcw$
y-direction scaling factor: $Ry=dsth/srch$ In step S805, it is determined whether or not reduction is specified for the image data, i.e., whether or not the scaling factor is 1 or less ($Rx \leq 1.0$ or $Ry \leq 1.0$), and when the determination result in step S805 is Yes, it is determined whether or not the image data is single-color data in a later step. If the determination result in step S805 is No, the image data is processed in step S810 as normal image data for which a scaling factor of 1 or more is specified.

Note that steps S803 and S804, and S805 need not be performed in this order.

In other words, it is determined whether or not the image data is within a specified size and reduction is specified.

In step S806, the gradation information of the image data is determined, and when the gradation information of the image data is neither 1 bpp (bpp=the number of gradation bits per pixel) nor 8 bpp, the image data is processed as normal image data in step S810. On the other hand, when the determination result in step S810 is Yes, it is determined in steps S807 and S808 whether or not the image data is single-color image data. When it is determined that the image data is not single-color image data, the image data is processed in step S810 as normal image data, similarly to the cases in which the determination results were No in steps prior to step S807. On the other hand, when the determination result in step S808 is Yes, the image data undergoes a conversion process such that the scaling factor of the image data becomes 1.0 and each of the parameters srcw and srch is rewritten, in the final step S809 of the image data processing.

In the present embodiment, the process branches on the basis of the determination result regarding the number of the gradation bits of the image data in step S806; however, the determination step S806 may be omitted when it is determined whether or not the image data is single-color image data for all the gradation levels supported by the PDL in step S807. Alternatively, when only image data having gradation of 1 bpp is assumed as the target, the processing may be limited to gradation of 1 bpp.

In the determination performed on a single-color image in step S807, the data size of one pixel is switched in accordance with the color space and the number of gradation levels of the image data as follows.

color space=RGB type: 1 pixel=3 bytes (each R,G,B channel is fixed to 8 bits)
color space=gray scale: 1 pixel=1 byte (fixed 256-level gradation)
color space=index type: 1 pixel=n bit (n=1/2/4/8: the same as the number of gradation bits)

Hence, by determining whether all of the pixels have the same color value, it can be determined whether the pixels have a single color.

As described above, determination of the color value of each of the pixels requires a large amount of time. Hence, this process may cause the total time of the image data processing to become undesirably long.

For this reason, this color value determination process is performed only when reduction of image data of a predetermined size or less is specified, thereby decreasing the loss time for the entirety of the processing.

Further, the present embodiment is configured so as to perform determination on single-color data only for image data in which both source image width (srcw) and height (srch) are 20 pixels or less; however, not limited to this value (20), a configuration may be used in which any value can be specified by a user operation, through a driver user interface, for example.

Image Data Conversion Process

A conversion process performed in step S809 for an image that has been determined to consist of a single color in step S807, will now be explained with reference to FIGS. 6, 10, and 12.

Figure 10:
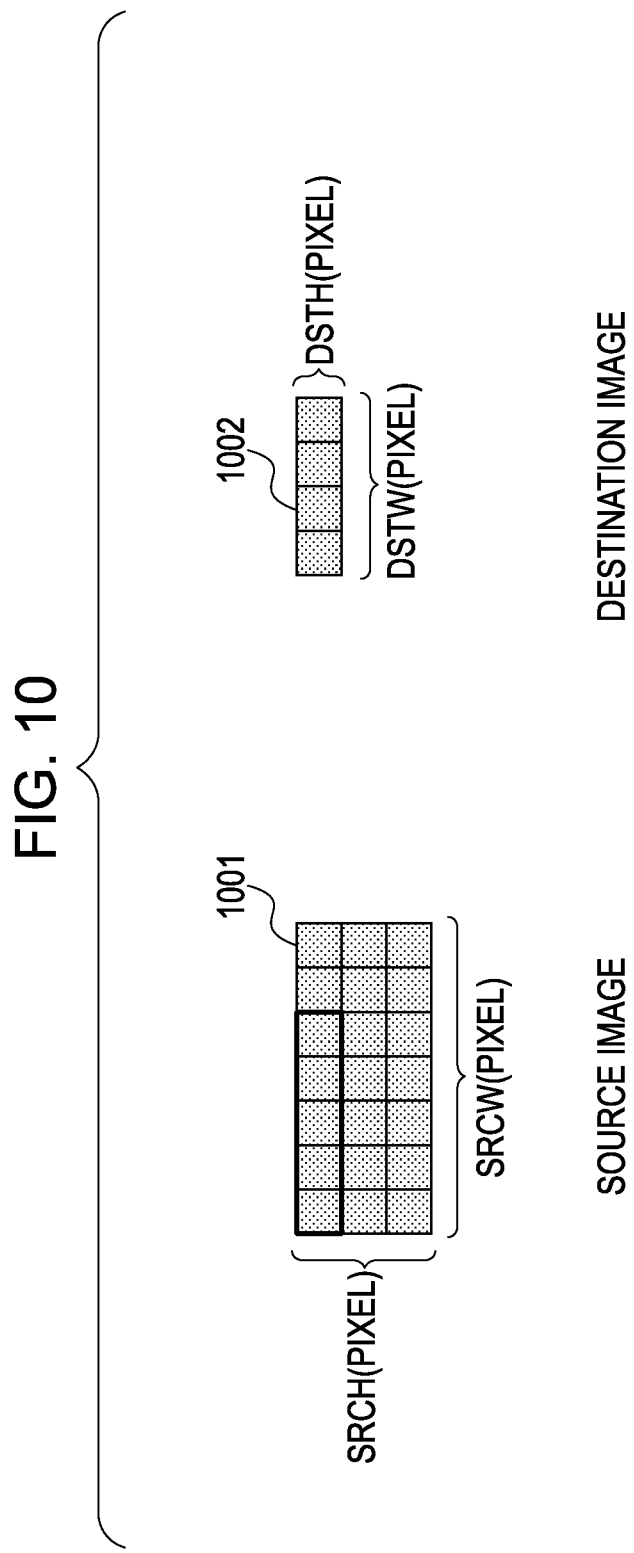
FIG. 10 illustrates a conversion method for single-color image data according to the first embodiment.

FIG. 10 illustrates a method of replacing image data according to the present embodiment. In FIG. 10, reference numeral 1001 denotes a source image before replacement, and reference numeral 1002 denotes a destination image shown in the form of pixels. Here, it is shown that the source image 1001 is a single-color image having a width (srcw) of 7 and a height (srch) of 3, and is reduced and rendered in an area having a width (dstw) of 4 and a height (dsth) of 1.

Here, it has been determined that the source image 1001 consists of a single image.

Hence, the reduction process is simplified by copying the pixels in the head portion of the image data in a number corresponding to the size of the destination image 1002, thereby omitting a known interpolation process such as a decimation process or a smoothing process.

Figure 6:
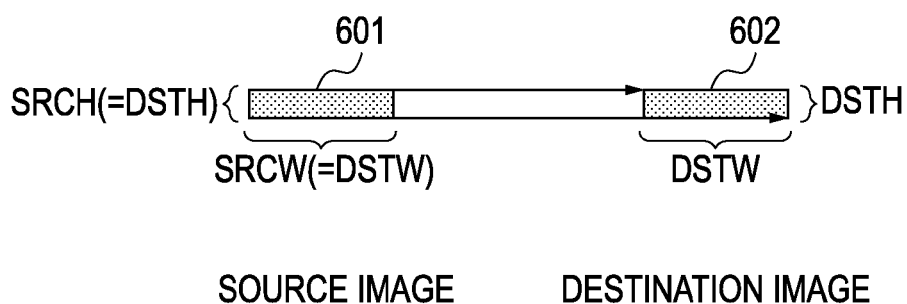
FIG. 6 illustrates how a source image is replaced with an image having a scaling factor of one, i.e., having the same size as that of a destination image using a printer driver according to the first embodiment.

FIG. 6 shows how a source image 601 is replaced, through the conversion process, with an image having the same size as that of a destination image 602, i.e., replaced with an image having a scaling factor of one. As shown in FIG. 6, srcw and srch are respectively replaced with dstw and dsth, resulting in a scaling factor of one. Hence, the printer 102 that receives the image data need not perform any scaling process such as enlarging or reducing.

FIG. 12 shows examples of image data rendering commands, created by the printer driver 207 according to the present embodiment, in which the image has been converted to an image having a scaling factor of one.

As shown by reference numeral 1201 in FIG. 12, the values of the parameters srcw and srch of a "start image" command are respectively replaced with the values of the width and height of the destination. Then in the real image data portion of a "transfer image" command, an amount of 2×1 pixels, which is the same as the size of the destination area, is specified. Here it is assumed that each pixel corresponding to the image data is arranged in the order of R/G/B, and the present embodiment shows the case of red single-color image data, where R=0xff, G=0, and B=0.

According to the present embodiment, it becomes unnecessary for a printer driver to transmit image data of a source image whose width and height are larger than those of a destination area.

This allows reduction in print data size, thereby increasing the speed of an image rendering process.

Further, it becomes unnecessary for an image processing apparatus to perform complex reduction processing, for each pixel, accompanied by interpolation in accordance with the scaling factor.

This allows reduction of the image data processing load of an image processing apparatus, thereby increasing the speed of a printing process.

Second Embodiment

The first embodiment showed an example in which a single-color source image for which reduction is specified is converted into a source image having the same size as that of a destination image, i.e., converted into a source image having a scaling factor of one with respect to a destination image; however, the method of conversion is not limited to this.

For instance, when the transmission path through which the image data after conversion is transmitted does not have high specifications, or when the printer 102 that receives the image data has a high processing power, a conversion method according to the present embodiment allows the data transmission load to be lowered.

Figure 7:
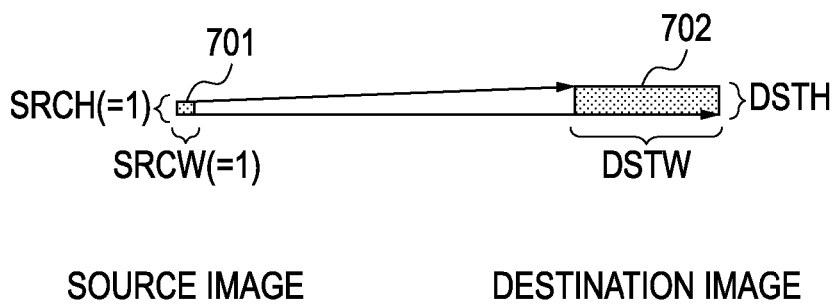
FIG. 7 illustrates how a source image is converted into a size which is the smallest pixel unit using a printer driver according to a second embodiment.

In other words, in the present embodiment, a source image is replaced with an image consisting of one pixel (1×1 pixel), which is the smallest configuration unit, as shown in FIG. 7. Referring to FIG. 7, a source image 701 (srcw=1 and srch=1) which consists of the minimum configuration unit is transmitted, and a destination image 702 is created from this.

Compared with the first embodiment, the present embodiment allows the data size of a source image to be reduced to the minimum, thereby enhancing the effect of data reduction on the transmission path.

In this case, an enlarging process is required in the printer 102 that receives the image data; however, the printer 102 is assumed to be configured so as to be able to perform the enlargement process at high speed using hardware such as an ASIC.

The following configuration can also be employed to lower the transmission load.

Single-color image data of a predetermined size required for a destination image may be prepared in the RAM 111 in advance.

In other words, when it has been determined by the single-color determination module 1405 that image data is single-color image data, the image replacing module 1406 may replace the input image data with the single-color image data prepared in advance, rather than newly creating converted image data whenever it is required.

Figure 13:
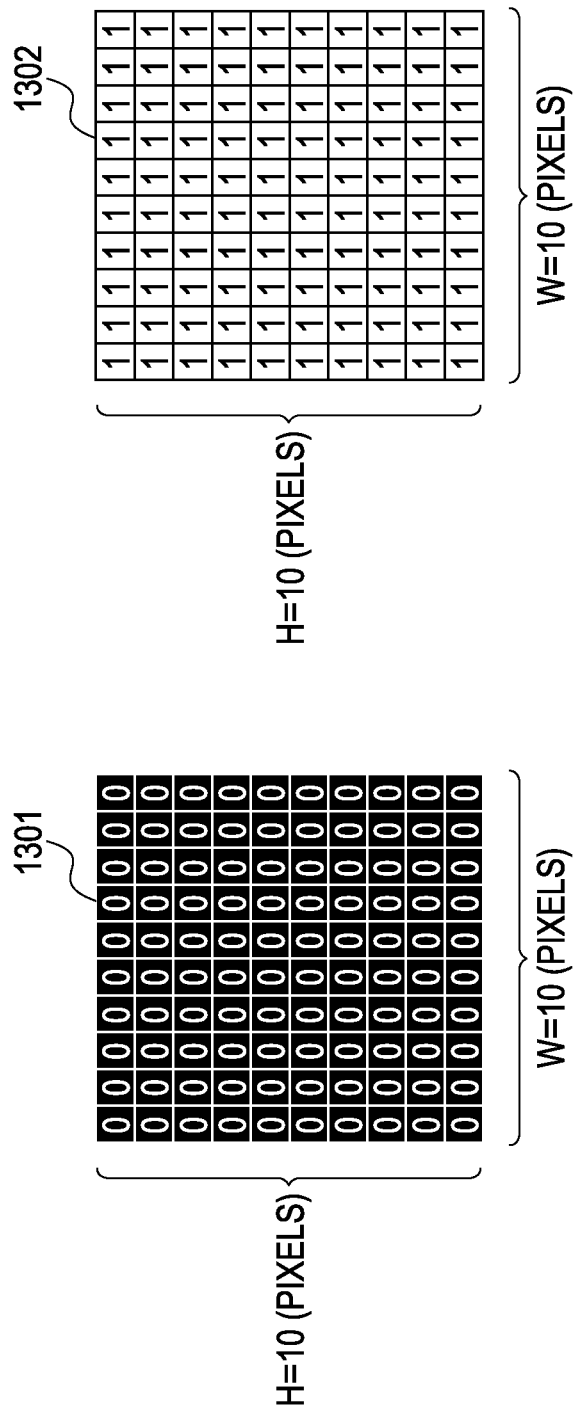
FIG. 13 illustrates an example of a data array used for image data conversion in the second embodiment.

Specifically, when the single-color determination for image data having 1 bpp gradation is performed under the condition of up to a maximum of 20×20 pixels, a configuration may be employed in which an array of only bits "0" and an array of only bits "1" are prepared in advance as shown in FIG. 13 so as to further increase the processing speed.

Since the color value of each pixel that corresponds to image data having 1 bpp gradation can take only 0 or 1, it is necessary to provide only two kinds of arrays (1301 and 1302). Further, since the maximum required width×height is 20×20 pixels, two 400-bit or 50-byte arrays can be applied to all the cases in which conversion is required.

For image data having a gradation of less than 8 bits, padding is performed such that the number of pixels in the width direction becomes multiples of eight. In this case, such an array of pixels that is 24 pixels wide and 20 pixels high is provided.

Third Embodiment

In this embodiment, the operation of the printer 102 will be described when it receives data, for which reduction has been specified by an application, scaled by the host computer before transmission to the printer 102, as described in the previous embodiments.

Specifically, the case will be described in which there exist successive image rendering commands that instruct the printer 102, which receives the image data scaled by the host computer, to keep or enlarge the size of the image data by a factor of one (same size) or more so as to realize the size specified by the application.

In the present embodiment, the interpretation results of the plurality of successive image rendering commands are temporarily spooled, so as to perform rendering processing in a batch mode.

As described above, the printer driver 207 converts single-color image data, for which reduction is specified, into image data having a specified scaling factor of one (same size) or more.

This configuration allows the number of program steps performed in the processing loop of a program stored in the program ROM 122a to be decreased. Further, since the number of accesses to the ROM 122, which is an external memory, performed by the printer CPU 121 decreases, the hit ratio of the instruction cache in the printer CPU 121 is increased.

Figure 9:
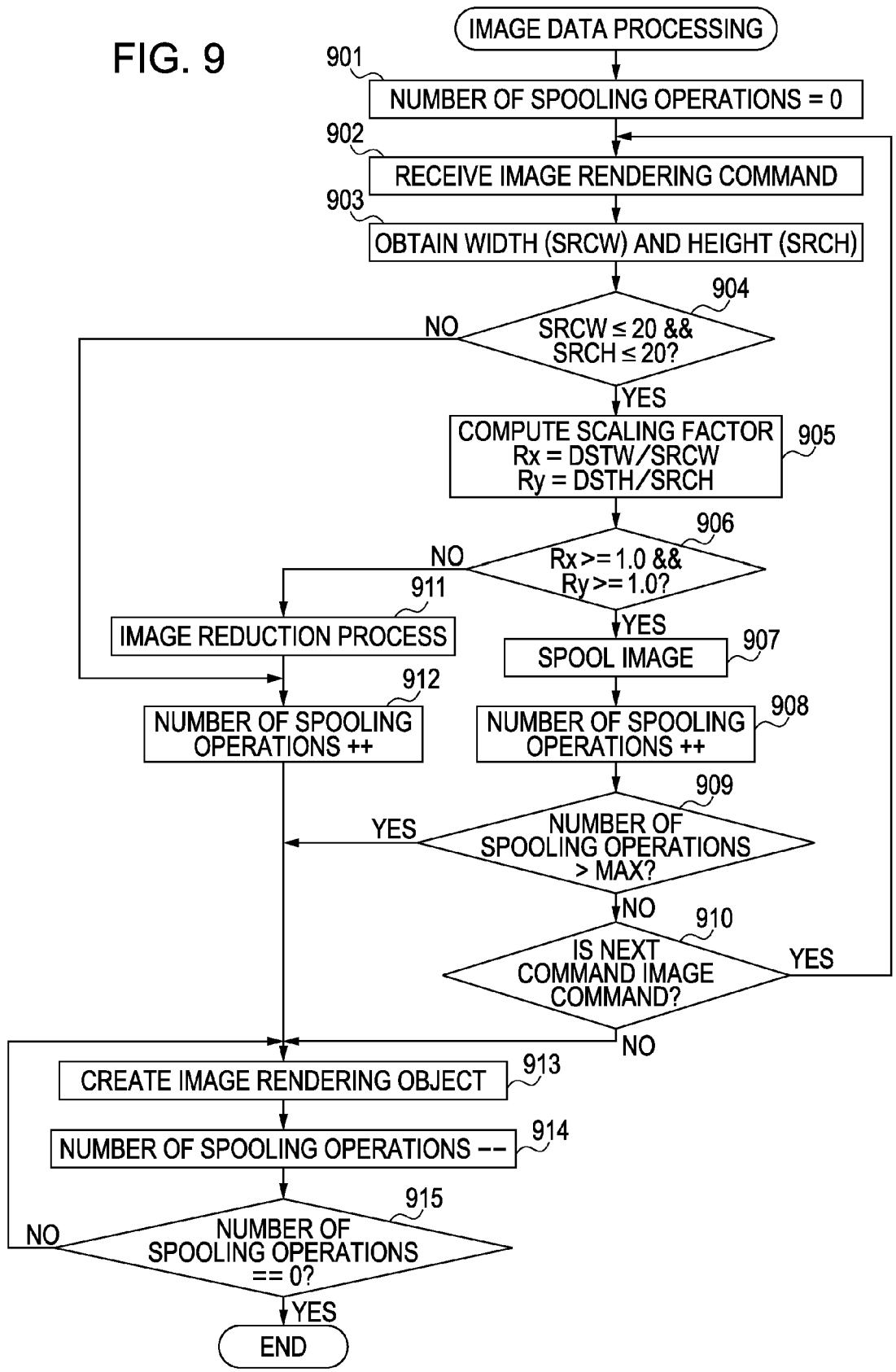
FIG. 9 is a flowchart showing the processing steps for a rendering command performed by a printer according to a third embodiment.

Hereinafter, the processing steps performed by the printer 102, when a series of rendering commands regarding image data are received, are explained with reference to the flowchart shown in FIG. 9.

First, in step S901, the number of times an image data block is spooled (number of spooling operations) is reset to zero as an initialization process. In steps S902 to S905, an image rendering command is received and a scaling factor is computed from the width and height parameters of the image data block. Since this is similar to the process performed by the printer driver 207 in the first embodiment, detailed explanation is omitted.

In step S906, it is determined whether or not both of the scaling factors Rx and Ry are one or more, and when the determination result is Yes, the image data block is spooled in step S907. Then, a plurality of the spooled image data blocks undergo a rendering process (steps S907 to S915), repeatedly. Here, the rendering process refers to a series of processes from the interpretation of image rendering commands to the creation of intermediate rendering objects (display list), which can be rendered.

When the image data block does not satisfy the determination condition regarding the width and/or height in step S904, or when the determination result in step S906 is No, the process of creating intermediate rendering objects including a reduction process is performed for the image data block in steps S911 to S915. Here, step S913 that creates the image rendering object has a structure in which a loop is repeated as many times as the number of spooling operations, hence the number of spooling operations is to be incremented by one in step S912.

In step S907, the parameters required for the creation of rendering objects and the image data block itself are obtained from the "start image" command, "transfer image" command, and "end image" command, and stored in the work memory 123d. In step S908, the number of spooled data blocks (number of spooling operations) is incremented by one, and it is determined whether or not the number of spooling operations is beyond a predetermined maximum number of spooling operations (fixed value "MAX" in FIG. 9) in step S909.

When it is determined in step S910 that the number of spooling operations does not exceed MAX, the subsequent rendering command is read in advance, and it is determined whether the read rendering command is a "start image" command, i.e., whether a subsequent image exists (step S910). When the read rendering command is a "start image" command, the flow goes back to step S902 to continue spooling.

When it is determined that the number of spooling operations exceeds MAX in step S909, or that the subsequent rendering command is not a "start image" instruction in step S910, the flow proceeds to step S913 to create image rendering objects from the image data blocks that have been spooled.

In the present embodiment, as described above, the flow of processing image rendering commands is divided into two loops: the processing loop (steps S902 to S910) of interpreting a PDL command, and the processing loop (steps S913 to S915) of creating an image rendering object. This allows efficient image data processing even when the CPU is configured to have a small cache, especially in the case in which a large number of images each having a minute size are to be processed.

Note that in order for the printer 102 to perform the above-described processing, the printer driver 207 can transmit image data in an uncompressed form so as to make it easy to determine whether or not received image data is single-color data.

Fourth Embodiment

When the total number of image data blocks included in a print job or a specific page is small, it may be more efficient not to perform the above-described process of single-color determination or replacement.

Hence, in the present embodiment, the number of image data blocks determined to have sizes of less than 20 pixels is counted.

By using this counting result, the present embodiment may be configured to perform the above-described process of single-color determination or the process of replacement only when the total number of image data blocks included in a print job is more than one.

In this case, the printer driver 207 is configured to spool the content of print instructions received via the graphic engine 204 on a page or print job basis. Note that a spooling technology is already disclosed for performing single-color determination or n-up printing, and hence, description thereof is omitted here.

Other Embodiments

The present invention may also be realized by performing the following processing. That is, by providing a system or an apparatus with a storage medium containing the program code of software that realizes the functions of the embodiments, the processing is performed in such a manner that the computer (or a CPU or an MPU) of the system or the apparatus reads the program code stored in the storage medium. In this case, the program code itself read from the storage medium realizes the functions of the embodiments, and hence, the program code and the storage medium containing the program code configure the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-197973 filed Jul. 31, 2008, which is hereby incorporated by reference herein in its entirety.

What is claimed is:

1. An information processing apparatus including at least one processor and memory communicatively-coupled via a bus that transmits a print job including input image data to an image processing apparatus to which the information processing apparatus is connected, comprising:
    a determination unit configured to determine whether or not a scaling factor for outputting a piece of the image data being included in the input print job and having a size smaller than a predetermined threshold by the image processing apparatus is one or less;
    a count unit configured to count a number of pieces of the image data which has the size smaller than the predetermined threshold and the scaling factor of which has been determined to be one or less by the determination unit;
    a spool unit configured to spool the input print job;
    a color value determination unit configured to determine whether the counted pieces of the image data spooled by a spool unit include pixels of the same color value in the case that the number of pieces of the image data counted by the count unit is equal to or more than two; and
    a replacement unit configured to replace the pieces of the image data in the print job, which have the size smaller than the predetermined threshold and the scaling factor of which has been determined to be one or less, with pieces of image data each having a size smaller than the piece of the input image, in the case that the color value determination unit has determined that the counted pieces of the image data include pixels of the same color value; and
    a transmission unit configured to transmit the replaced pieces of the image data to the image processing apparatus.

2. The information processing apparatus according to claim 1, wherein the replacement unit replaces the pieces of the input image data after the pieces of the image data are replaced with pieces of image data each having a size specified for outputting the pieces of the input image data.

3. The information processing apparatus according to claim 1, wherein the replacement unit replaces the pieces of the input image data after the pieces of the image data are replaced with pieces of image data made up of one pixel.

4. A method of information processing that controls an information processing apparatus that transmits a print job including input image data to an image processing apparatus to which the information processing apparatus is connected, the method comprising:
    a determining step of determining whether or not a scaling factor for outputting a piece of the image data being included in the input print job and having a size similar than a predetermined threshold by the image processing apparatus is one or less;
    a counting step of counting a number of pieces of the image data which has the size smaller than the predetermined threshold and the scaling factor of which has been determined to be one or less;
    a spooling step of spooling the input print job;
    a color value determining step of determining whether the counted pieces of the image data spooled by a spool unit include pixels of the same color value in the case that the number of pieces of the image data counted is equal to or more than two;
    a replacement step of replacing the pieces of the image data in the print job, which have the size smaller than the predetermined threshold and the scaling factor of which has been determined to be one or less, with pieces of image data each having a size smaller than the piece of the input image, in the case that in the color value determination step it is determined that the counted pieces of the image data include pixels of the same color value; and a transmitting step of transmitting, in the case that it has been determined in the color value determining step that the pixels corresponding to the image data block have the same color value, a replacement image data block having a smaller size than the original image data block.

5. The method of information processing according to claim 4, wherein the pieces of the input image data are replaced, after the pieces of the image data are replaced with pieces of image data each having a size specified for outputting the pieces of the input image data.

6. The method of information processing according to claim 4, wherein the pieces of the input image data are replaced, after the pieces of the image data black are replaced with pieces of image data made up of one pixel.

7. A non-transitory computer-readable storage medium storing a program configured to execute the image processing method according to claim 4.

* * * * *